(12) United States Patent
Huang

(10) Patent No.: US 9,028,101 B2
(45) Date of Patent: May 12, 2015

(54) DISPLAY LIGHT SOURCE

(71) Applicant: Delta Electronics, Inc., Taoyuan Hsien (TW)

(72) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 105 days.

(21) Appl. No.: 13/743,954

(22) Filed: Jan. 17, 2013

(65) Prior Publication Data

US 2014/0104841 A1  Apr. 17, 2014

(30) Foreign Application Priority Data

Oct. 15, 2012  (TW) .............................. 101137864 A

(51) Int. Cl.
*F21V 13/08* (2006.01)
*F21V 13/14* (2006.01)
*F21V 17/02* (2006.01)
*G02B 27/22* (2006.01)
*H04N 9/31* (2006.01)
*H04N 13/04* (2006.01)

(52) U.S. Cl.
CPC .................. *F21V 13/08* (2013.01); *F21V 17/02* (2013.01); *F21V 13/14* (2013.01); *G02B 27/2242* (2013.01); *H04N 9/31* (2013.01); *H04N 13/0404* (2013.01); *H04N 13/0445* (2013.01); *H04N 13/0459* (2013.01)

(58) Field of Classification Search
CPC ......... F21V 13/08; F21V 13/14; F21V 17/02; H04N 9/31; G02B 27/2242
USPC .................................. 362/263, 280, 293, 339
See application file for complete search history.

(56) References Cited

U.S. PATENT DOCUMENTS

| 2002/0105729 | A1* | 8/2002 | Richards et al. .............. 359/634 |
| 2009/0027631 | A1* | 1/2009 | Liu et al. ......................... 353/84 |
| 2010/0238413 | A1* | 9/2010 | Huang ............................ 353/33 |
| 2011/0211333 | A1* | 9/2011 | Bartlett .......................... 362/84 |
| 2012/0201030 | A1* | 8/2012 | Yuan et al. ..................... 362/293 |
| 2013/0258639 | A1* | 10/2013 | Hu et al. ......................... 362/84 |
| 2013/0271954 | A1* | 10/2013 | Li et al. ........................... 362/84 |

OTHER PUBLICATIONS

N. A. Dodgson et al., "A time sequential multi-projector autostereoscopic display," Computer Laboratory, University of Cambridge, Cambridge, UK, Journal of the Society for Information Display 8(2), 2000, pp. 169-176.

\* cited by examiner

*Primary Examiner* — Mary McManmon
*Assistant Examiner* — Mitchell Errett
(74) *Attorney, Agent, or Firm* — Lowe Hauptman & Ham, LLP

(57) ABSTRACT

A display light source includes a light source, a color wheel, an optical module, and an actuator. The light source provides a light beam. The color wheel includes a first path segment and a second path segment. Each of the first path segment and the second path segment includes a reflective segment and at least one filtering segment. When the light beam impinges on the filtering segment of the first path segment, the light beam passes through the filtering segment of the first path segment and is filtered to form a first primary-color light beam. When the light beam impinges on the reflective segment of the first path segment, the light beam is reflected to the optical module. The optical module guides the reflected light beam to the filtering segment of the second path segment, such that the reflected light beam is filtered to form a second primary-color light beam.

7 Claims, 6 Drawing Sheets

DISPLAY LIGHT SOURCE

RELATED APPLICATIONS

This application claims priority to Taiwan Application Serial Number 101137864, filed Oct. 15, 2012, which is herein incorporated by reference.

BACKGROUND

1. Technical Field

The present disclosure relates to a display light source.

2. Description of Related Art

Exploiting the binocular parallax of humans, a stereoscopic display provides two different images respectively to the two eyes of an observer, such that the observer can experience a stereoscopic image. Unlike other kinds of stereoscopic displays which require the use of special glasses to distinguish between left-eye and right-eye images, special glasses are unnecessary when using an autostereoscopic display.

The autostereoscopic display provides a plurality of images by using a plurality of light sources, in which the images are projected to different spatial positions. The eyes of an observer can receive different images such that the observer perceives a stereoscopic image when his or her eyes correspond to any two of the spatial positions respectively. Since the autostereoscopic display projects the plurality of images to different viewing angles of the observer, the autostereoscopic display is also called a multi-view stereoscopic display.

The light sources of conventional autostereoscopic displays mostly are cathode ray tubes (CRTs). Since each of the cathode ray tubes provides an image, this results in an overall large size for the display. In addition, with the conventional autostereoscopic display, only a single light source provides an image at any one time, and all the other light sources remain shielded. Therefore, most of the light is wasted. Moreover, a big and expensive projection lens is required, and special projection lenses are required when multiple cathode ray tubes are used. Also, the refresh rate of the cathode ray tube is limited. Therefore, those in the industry are endeavoring to design a light source that is small and highly efficient.

SUMMARY

A display light source includes a light source, a color wheel, an optical module, and an actuator. The light source is for providing a light beam. The color wheel includes a first path segment and a second path segment. Each of the first path segment and the second path segment includes a reflective segment and at least one filtering segment. The optical module disposed between the light source and the color wheel is for guiding the light beam to the color wheel. The actuator is for rotating the color wheel, such that the light beam impinges on at least one of the reflective segments and the filtering segments of the first path segment and the second path segment. When the light beam impinges on the filtering segment of the first path segment, the light beam passes through the filtering segment of the first path segment and is filtered to form a first primary-color light beam. When the light beam impinges on the reflective segment of the first path segment, the light beam is reflected to the optical module. The optical module guides the reflected light beam to the filtering segment of the second path segment, such that the reflected light beam passes through the second path segment and is filtered to form a second primary-color light beam.

In one or more embodiments, the first path segment is disposed on the inner loop of the color wheel, and the second path segment is disposed on the outer loop of the color wheel.

In one or more embodiments, the filtering segment of the first path segment aligns to the reflective segment of the second path segment along the radial direction of the color wheel.

In one or more embodiments, the reflective segment of the first path segment aligns to the filtering segment of the second path segment along the radial direction of the color wheel.

In one or more embodiments, the filtering segment of the first path segment includes a plurality of primary-color filtering segments.

In one or more embodiments, the filtering segment of the second path segment includes a plurality of primary-color filtering segments.

In one or more embodiments, the optical module includes an isosceles prism, a pair of wedge prisms, and a condenser lens. A bottom surface of the isosceles prism is a refractive surface. A long-side surface of each of the wedge prisms is an incident surface. A total internal reflection gap is formed between the other long-side surface of each of the wedge prisms and an opposing equal-side surface of the isosceles prism. The condenser lens is disposed between the isosceles prism and the color wheel. The condenser lens is for converging a light beam that travels from the refractive surface of the isosceles prism to the color wheel, and guiding a light beam that travels from the reflective segments of the first path segment and the second path segment to the refractive surface of the isosceles prism.

In one or more embodiments, an angle between the two long-side surfaces of each of the wedge prisms satisfies the following relationship:

$\theta = -\tan^{-1}((n\cos 3\phi + \sin \phi)/(n \sin 3\phi + \cos \phi))$, where $\theta$ is the angle between the two long-side surfaces of the each of the wedge prisms, n is a refractive index of the isosceles prism and the pair of the wedge prisms, and $\phi$ is a bottom angle of the isosceles prism.

In one or more embodiments, the condenser lens includes at least one convex lens.

In one or more embodiments, the light source is a high-pressure mercury lamp.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
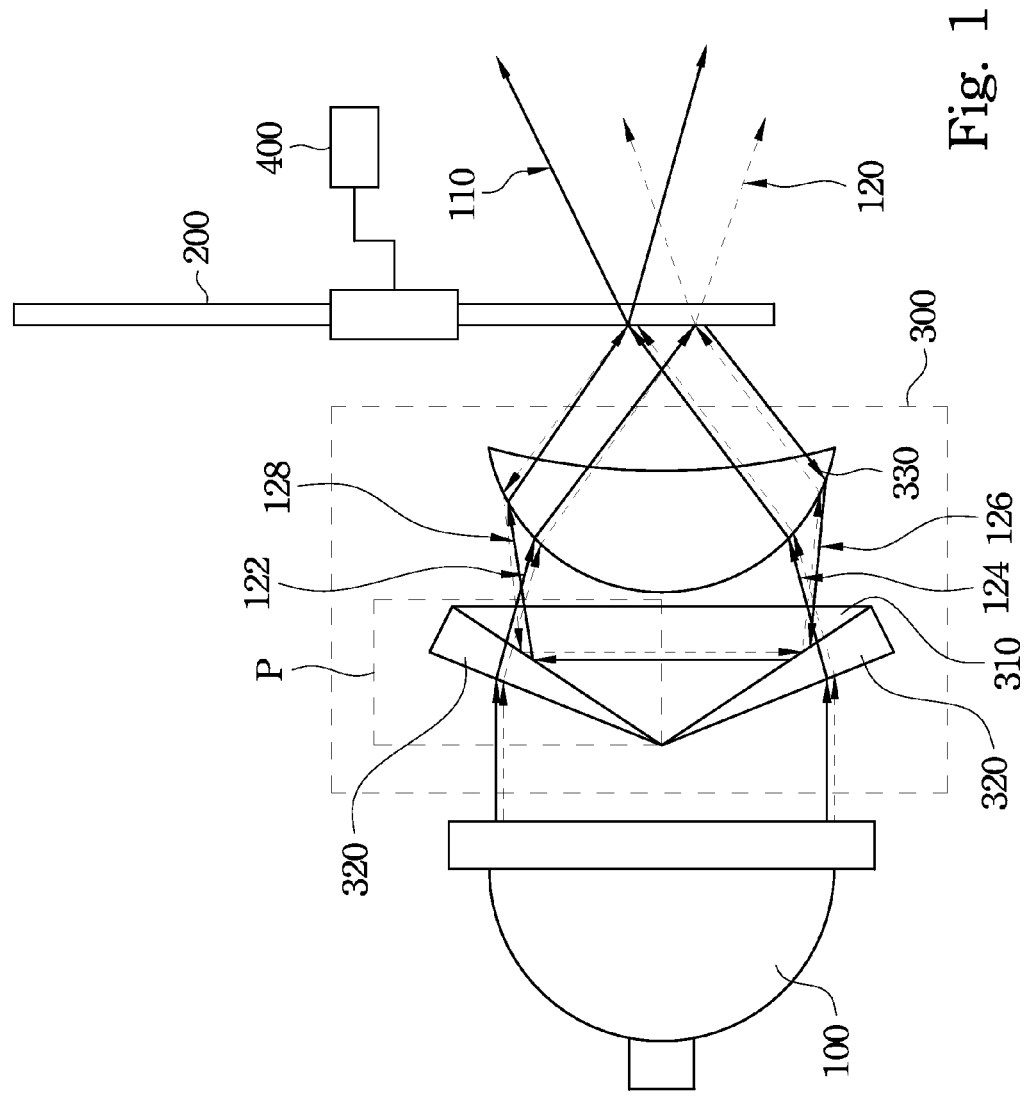
FIG. 1 is a schematic diagram of a display light source according to one embodiment of the present invention.
Figure 2:
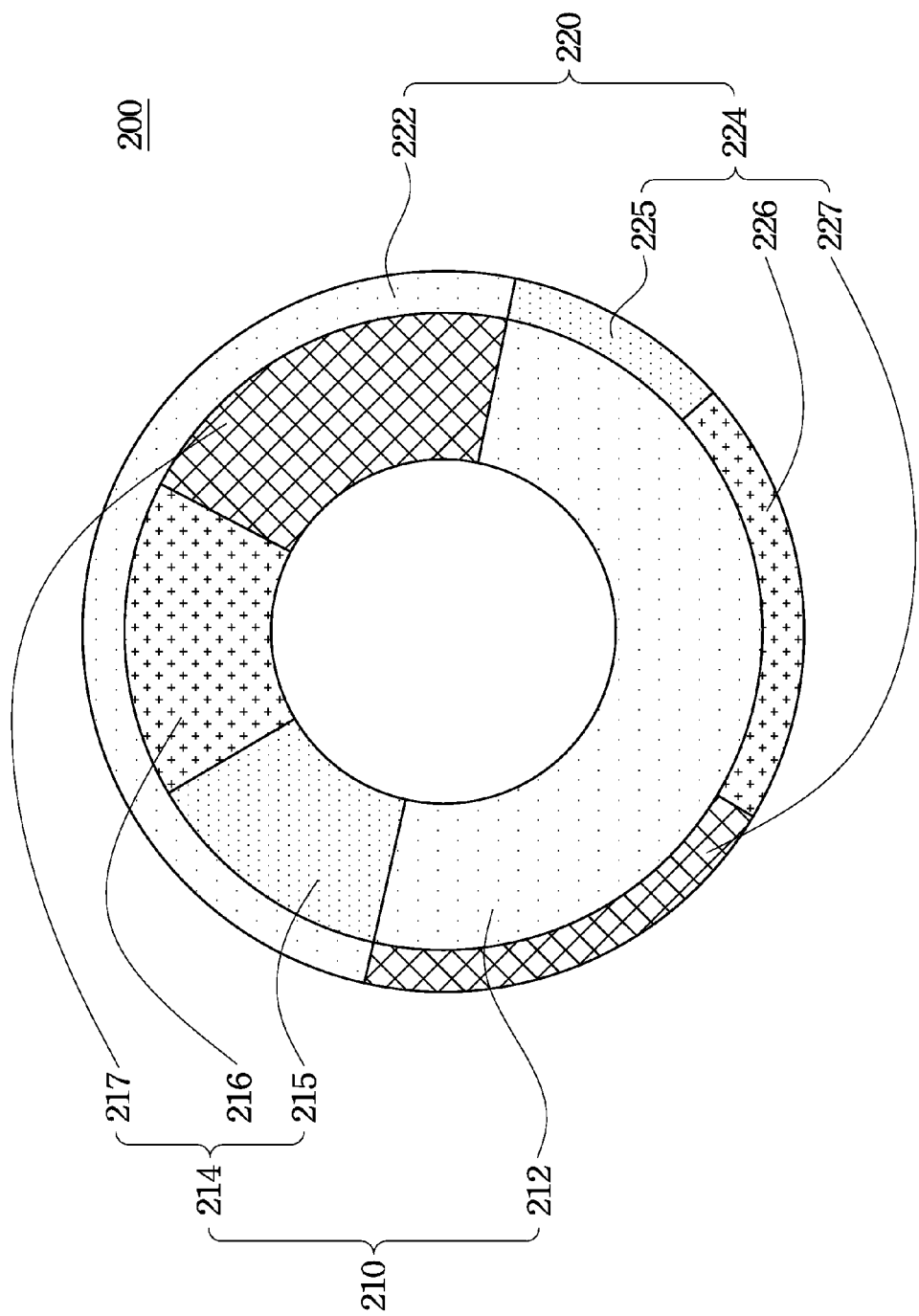
FIG. 2 is a front view of a color wheel of FIG. 1.

FIG. 1 is a schematic diagram of a display light source according to one embodiment of the present invention. FIG. 2 is a front view of a color wheel 200 of FIG. 1. The display light source includes a light source 100, a color wheel 200, an optical module 300, and an actuator 400. The light source 100 is for providing a light beam. The color wheel 200 includes a first path segment 210 and a second path segment 220. The first path segment 210 includes a reflective segment 212 and at least one filtering segment 214. The second path segment 220 includes a reflective segment 222 and at least one filtering segment 224. The optical module 300 is disposed between the light source 100 and the color wheel 200, and is for guiding the light beam provided by the light source 100 to the color wheel 200. The actuator 400 rotates the color wheel 200, such that the light beam impinges on at least one of the reflective segments 212, 222 and the filtering segments 214, 224 of the first path segment 210 and the second path segment 220. When the light beam impinges on the filtering segment 214 of the first path segment 210, the light beam passes through the filtering segment 214 of the first path segment 210, and is filtered to form a first primary-color light beam 110. When the light beam impinges on the reflective segment 212 of the first path segment 210, the light beam is reflected to the optical module 300. The optical module 300 guides the reflected light beam to the filtering segment 224 of the second path segment 220, such that the reflected light beam passes through the second path segment 220, and is filtered to form a second primary-color light beam 120.

In greater detail, during a particular time period for example, the light beam simultaneously impinges on the filtering segment 214 of the first path segment 210 and the reflective segment 222 of the second path segment 220, as shown by the solid arrows in FIG. 1. A portion of the light beam impinging on the filtering segment 214 of the first path segment 210 is directly filtered to form the first primary-color light beam 110, and a portion of the light beam impinging on the reflective segment 222 of the second path segment 220 is reflected. The reflected light beam is directed back to the optical module 300, and is then guided to the filtering segment 214 of the first path segment 210 though a series of reflections and refractions in the optical module 300, such that the reflected light beam is filtered to form the first primary-color light beam 110.

In contrast, in another time period, the actuator 400 rotates the color wheel 200, such that the light beam simultaneously impinges on the reflective segment 212 of the first path segment 210 and the filtering segment 224 of the second path segment 220, as shown by the dashed arrows in FIG. 1. A portion of the light beam impinging on the filtering segment 224 of the second path segment 220 is directly filtered to form the second primary-color light beam 120, and a portion of the light beam impinging on the reflective segment 212 of the first path segment 210 is reflected. The reflected light beam is directed back to the optical module 300, and is then guided to the filtering segment 224 of the second path segment 220 though a series of reflections and refractions in the optical module 300, such that the reflected light beam is filtered to form the second primary-color light beam 120. It should be understood that the solid arrows and the dashed arrows are illustratively shown as the edges of the light beam.

Therefore, the light beam emitted from the light source 100 becomes the first primary-color light beam 110 and the second primary-color light beam 120 having different light paths in sequence through cooperation of the optical module 300, the reflective segments 212, 222 of the color wheel 200, and the filtering segments 214, 224 of the color wheel 200. Since the portions of the light beam impinging on the reflective segments 212 and 222 can be respectively guided to the filtering segments 224 and 214 by the optical module 300, the first primary-color light beam 110 and the second primary-color light beam 120 can substantially maintain the brightness of the light beam emitted from the light source 100.

As shown in FIG. 2, the first path segment 210 is disposed on the inner loop of the color wheel 200, and the second path segment 220 is disposed on the outer loop of the color wheel 200. In greater detail, the filtering segment 214 of the first path segment 210 aligns to the reflective segment 222 of the second path segment 220 along the radial direction of the color wheel 200, and the reflective segment 212 of the first path segment 210 aligns to the filtering segment 224 of the second path segment 220 along the radial direction of the color wheel 200. However, the above arrangement does not limit the scope of the present invention. The display light source will be able to achieve the same result as long as the light beam simultaneously impinges on the reflective segment of one path segment and the filtering segment of the other path segment in the same time period, and the reflective light beam can be reflected to the filtering segment of the other path segment. A person having ordinary skill in the art may design the arrangement of each segment of the color wheel 200 according to actual requirements.

The filtering segments 214 and 224 may respectively include a plurality of primary-color filtering segments for providing color light beams. The 10 primary-color filtering segments can filter the light beam to form primary-color light beams with different wavelengths. In this embodiment, the primary-color filtering segments may be blue filtering segments 215 and 225, green filtering segments 216 and 226 and/or red filtering segments 217 and 227. Therefore, the first primary-color light beam 110 may be a first blue light beam, a first green 15 light beam, or a first red light beam, and the second primary-color light beam 120 may be a second blue light beam, a second green light beam, or a second red light beam. However, in one or more embodiments, the primary-color filtering segments may further include a yellow filtering segment for enhancing the brilliance of the images. Reflective segment 212 and filtering segments 215, 216, 217 are arranged along an arcuate direction of the color wheel 200. Reflective segment 222 and filtering segments 225, 226, 227 are arranged along another arcuate direction of the color wheel 200. It should be understood that the colors of the 20 primary-color filtering segments are illustrative only and should not limit the scope of the claimed invention. A person having ordinary skill in the art may choose the colors of the primary-color filtering segments according to actual requirements.

Figure 3:
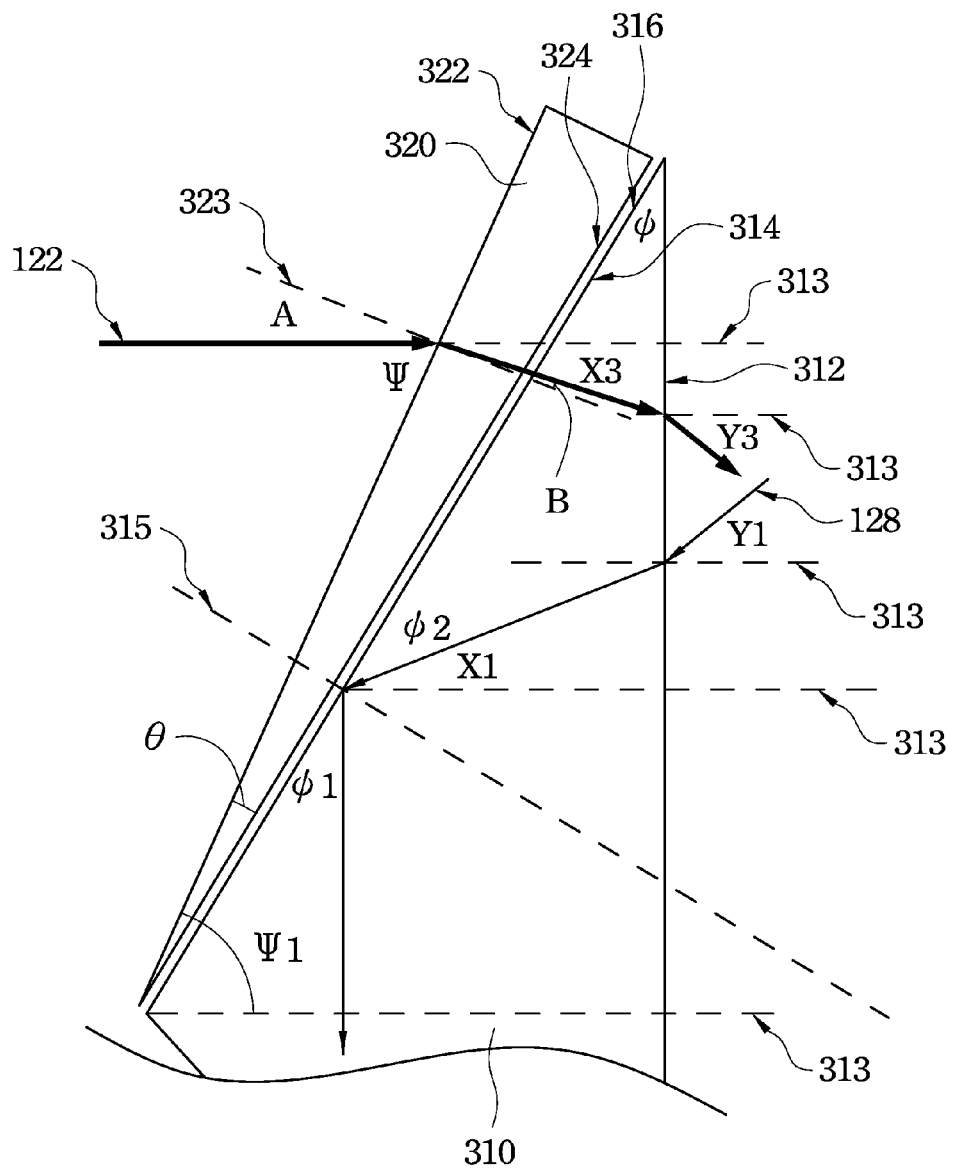
FIG. 3 is a magnified schematic diagram of area P of FIG. 1.

Reference is made to FIG. 1 and FIG. 3. FIG. 3 is a magnified schematic diagram of area P of FIG. 1. In this embodiment, the optical module 300 includes an isosceles prism 310, a pair of wedge prisms 320, and a condenser lens 330. A bottom surface 312 of the isosceles prism 310 is a refractive surface. A long-side surface 322 of each wedge prism 320 is an incident surface. A total internal reflection gap 316 is formed between a long-side surface 324 of each wedge prism 320 and an opposing equal-side surface 314 of the isosceles prism 310. The condenser lens 330 is disposed between the isosceles prism 310 and the color wheel 200. The condenser lens 330 is for converging a light beam that travels from the refractive surface of the isosceles prism 310 to the color wheel 200, and guiding a light beam that travels from the reflective segments 212 and 222 of the first path segment 210 and the second path segment 220 to the refractive surface of the isosceles prism 310.

In one or more embodiments, the condenser lens 330 may include two convex lenses. When a parallel light beam is incident to the condenser lens 330, the condenser lens converges the parallel light beam to a focal point. In contrast, when a point light source is incident to the condenser lens 330 from the focal point of the condenser lens 330, the condenser lens 330 diverges the point light source to be a parallel light beam. In one or more embodiments, the light source 100 may be a high-pressure mercury lamp with parabolic reflector, such that the light beam the light source 100 provides is a parallel light beam.

It should be understood a total internal reflection angle may exist on the interface between a prism, the isosceles prism 310 or the wedge prism 320 for example, and the air, and the value of the total internal reflection angle depends on the material of the prism. A light beam incident to the interface from the prism at an angle larger than the total internal reflection angle can be total reflected, while a light beam incident to the interface from the prism at an angle smaller than the total internal reflection angle can pass through the interface.

The following paragraphs provide detailed explanations with respect to how to design the isosceles prism 310 and the wedge prisms 320 to achieve the reflections and the refractions mentioned above. It should be understood that the paths indicated with solid arrows and the paths indicated with dashed arrows are substantially the same paths, except for the fact that the travel directions thereof may be opposite. Therefore, to simplify matters, only explanations with respect to the paths indicated with the solid arrows will be described in the following paragraphs.

In this embodiment, the light beam emitted from the light source 100 is a parallel light beam. The light beams 122 and 124 have the same refractive angle on the bottom surface 312 of the isosceles prism 310 (as shown in FIG. 3) since a prism group formed by the isosceles prism 310 and the pair of the wedge prisms 320 realizes mirror symmetry along the bottom surface 312. In addition, the light beams 122 and 126 may be designed to be a set of parallel light beams, and the light beams 124 and 128 may be designed to be another set of parallel light beams so as to correspond to the optical mechanism of the collimator. The focal point of the light beams 122 and 126 through the collimator is on the second path segment 220 of the color wheel 200 (see FIG. 2), and the focal point of the light beams 124 and 128 through the collimator is on the first path segment 210 of the color wheel 200 (see FIG. 2). Therefore, the light beams 122, 124, 126, and 128 have the same refractive angle on the bottom surface 312.

The prism group realizes mirror symmetry along the triangle height of the isosceles prism 310. The following paragraphs provide an explanation with respect to the area P of FIG. 1, in which the area P is an upper part of the prism group. Since the same conclusions can be reached with respect to a bottom part of the prism group (i.e., the same as the upper part of the prism group), details of the bottom part of the prism group are not repeated hereinafter.

Figure 4:
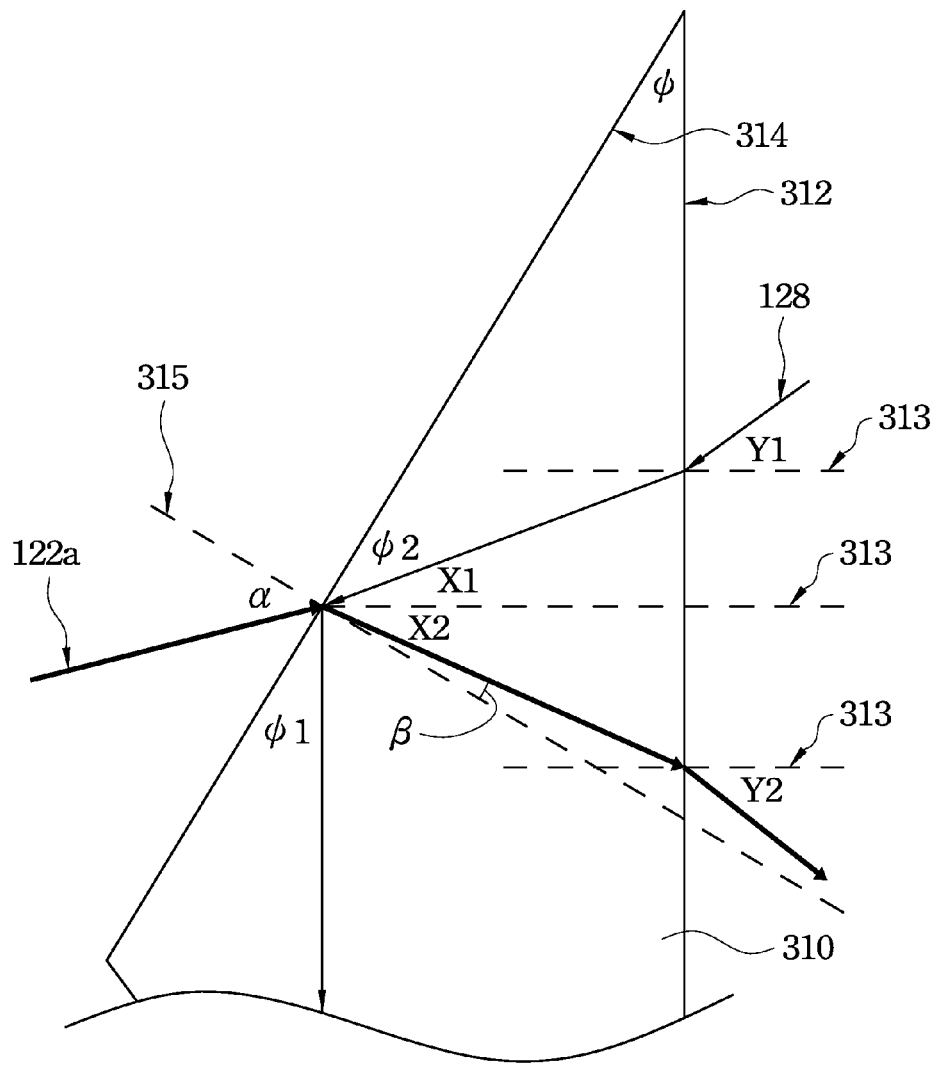
FIG. 4 is an optical schematic diagram of the upper part of an isosceles prism of FIG. 1.

Reflections and refractions of the light beams in the isosceles prism 310 are first considered. FIG. 4 is an optical schematic diagram of the upper part of the isosceles prism 310 of FIG. 1. The isosceles prism 310 has a refractive index n and a bottom angle θ. Each equal-side surface 314 of the isosceles prism 310 has a normal line 315, and the bottom surface 312 of the isosceles prism 310 has a normal line 313. When the wedge prism 320 corresponding to the upper part of the prism group is absent (see FIG. 3), the light beam 128 is incident to the bottom surface 312 of the isosceles prism 310 at an angle Y1 to the normal line 313 and reaches the equal-side surface 314. The light beam 128 is totally reflected on the equal-side surface 314 since the incident angle (X1+X2+β) to the normal line 315 is larger than the total internal reflection angle of the equal-side surface 314. The light beam 128 reflected on the equal-side surface 314 is parallel to the bottom surface 312, and since the incident angle equals the reflective angle, φ1=φ=φ2. The light beam 122a is incident to the equal-side surface 314 of the isosceles prism 310 at an angle α to the normal line 315, and then emerges from the bottom surface 312 of the isosceles prism 310 at an angle Y2 to the normal line 313. So that the light beams 128 and 122a have the same refractive angle to the normal line 313 of the bottom surface 312, Y1 is set equal to Y2 (Y1=Y2). According to Snell's law and Parallel postulate, X1=X2. The angle X1 is then given by X1=90°−2φ since (X2+β)=φ from the Similar Triangle theory. From Snell's law, $\sin \alpha = n \sin \beta,$ $\sin \alpha = n \sin(\phi - 90° + 2\phi),$ yields, $\alpha = -\sin^{-1}(n \cos 3\phi).$ Reference is made back to FIG. 3. Reflections and refractions of the light beams in the prism group composed of the isosceles prism 310 and one of the wedge prisms 320 are considered. The wedge prism 320 has a refractive index n and an angle θ between two long-side surfaces 322 and 324. When the wedge prism 320 is included in the configuration, the light beam 122 is incident at a direction parallel to the normal line 313 (the incident direction of the parallel light beam the light source 100 provides), and emerges from the bottom surface 312 of the isosceles prism 310 at an angle Y3=Y1 to the normal line 313. An incident angle of the light beam 122 is A, and the light beam 122 is incident to the equal-side surface 314 of the isosceles prism 310 at an angle B to the normal line 323. According to the Parallel postulate and Similar Triangle theory, ψ=ψ1, and φ=X3+B+θ. On the other hand, X3=X1 since Y3=Y1, hence B=3φ−90°−θ and A=90°−ψ=90°−ψ1=90°−(90°−φ+θ)=φ−θ. According to Snell's law, $\sin A = n \sin B,$ $\sin(\phi - \theta) = n \sin(3\phi - 90° - \theta),$ yields, $\theta = -\tan^{-1}((n \cos 3\phi + \sin \phi)/(n \sin 3\phi + \cos \phi)).$ In this embodiment, φ=41.2452°, α=57.39°, and θ=5.14° if n=1.5168.

Figure 5:
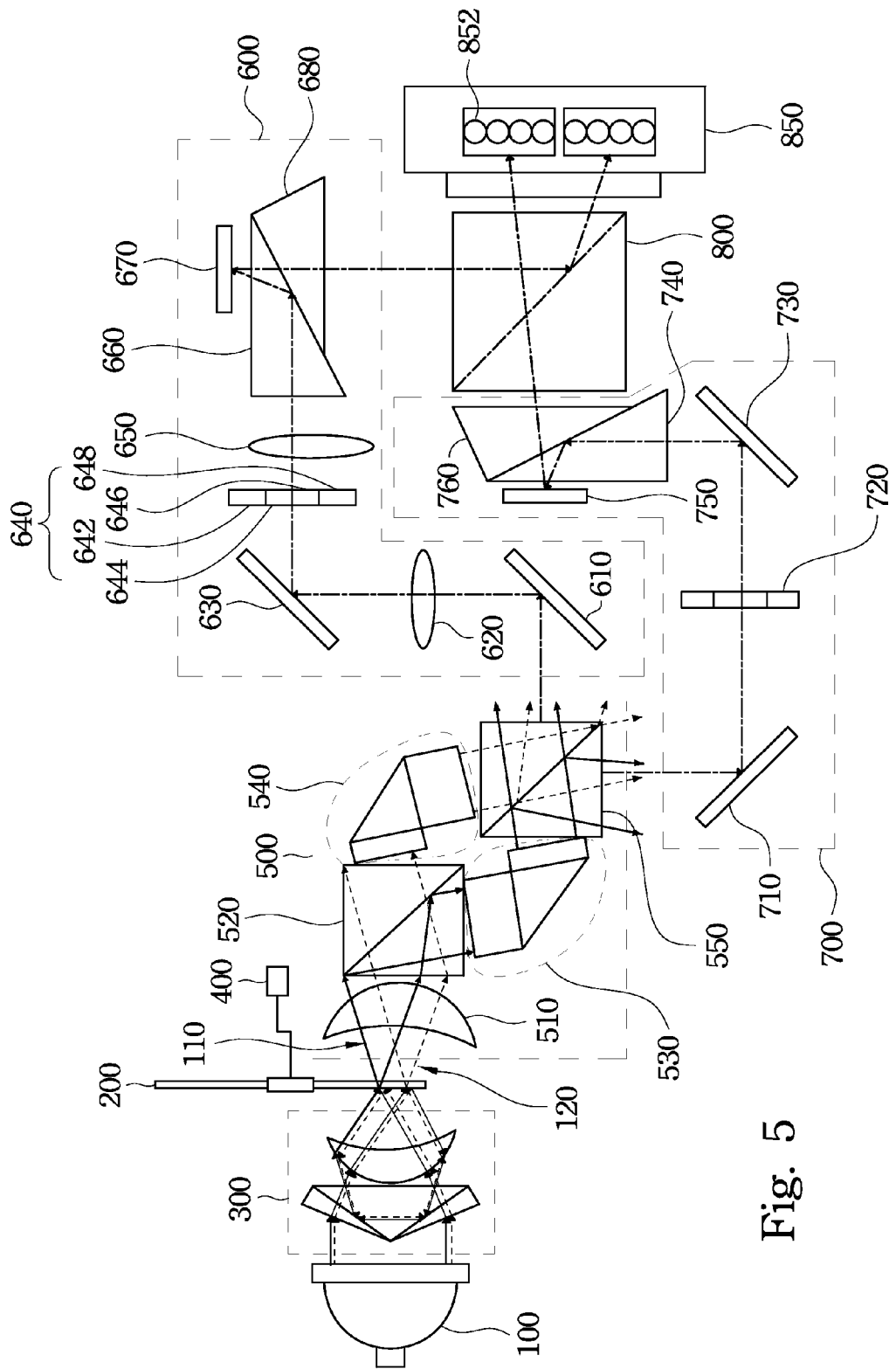
FIG. 5 is a schematic diagram of a multi-view display applying the display light source of FIG. 1.

FIG. 5 is a schematic diagram of a multi-view display applying the display light source of FIG. 1. The multi-view display includes the display light source, a polarized beam splitting module 500, a first liquid crystal beam splitting module 600, a second liquid crystal beam splitting module 700, a polarized beam combining module 800, and a projection lens 850.

The polarized beam splitting module 500 is disposed behind the color wheel 200, and the polarized beam splitting module 500 is for splitting the travel paths of the first primary-color light beam 110 and the second primary-color light beam 120. The polarized beam splitting module 500 includes a parallel light generating element 510, a total internal reflection prism group 520, a first light guiding element 530, a second light guiding element 540, and a polarized beam splitting element 550. After passing through the parallel light generating element 510, each of the first primary-color light beam 110 and the second primary-color light beam 120 is incident to the total internal reflection prism group 520 in a parallel state. The total internal reflection prism group 520 includes two prisms adjacent to each other and disposed face to face, and a total internal reflection gap exists at the interface between these two prisms. The first primary-color light beam 110 incident to the total internal reflection gap at an angle larger than the total internal reflection angle can be reflected to the first light guiding element 530, while the second primary-color light beam 120 incident to the total internal reflection gap at an angle smaller than the total internal reflection angle can pass through the total internal reflection gap, and reaches the second light guiding element 540. The first light guiding element 530 and the second light guiding element 540 respectively guide the first primary-color light beam 110 and the second primary-color light beam 120 to two orthogonal surfaces of the polarized beam splitting element 550. The polarized beam splitting element 550 then turns each of the first primary-color light beam 110 and the second primary-color light beam 120 into a light beam with a first polarization state and a light beam with a second polarization state. Hence, the first primary-color light beam 110 with the first polarization state and the second primary-color light beam 120 with the second polarization state enter the first liquid crystal beam splitting module 600, and the first primary-color light beam 110 with the second polarization state and the second primary-color light beam 120 with the first polarization state enter the second liquid crystal beam splitting module 700 for further beam splitting.

The first liquid crystal beam splitting module 600 includes reflectors 610 and 630, convex lenses 620 and 650, a liquid crystal slit group 640, prisms 660 and 680, and a light modulator 670. The reflectors 610 and 630 first guide the first primary-color light beam 110 with the first polarization state and the second primary-color light beam 120 with the second polarization state to the liquid crystal slit group 640, during which the convex lenses 620 converge the light beams. The liquid crystal slit group 640 includes at least four liquid crystal segments 642, 644, 646, and 648. The convex lens 620 guides the first primary-color light beam 110 with the first polarization state to the liquid crystal segments 642 and 644, and guides the second primary-color light beam 120 with the second polarization state to the liquid crystal segments 646 and 648. The light beams therefore form four light beams in sequence after passing through the liquid crystal slit group 640. These four light beams then pass through the convex lens 650 to be diverged and formed into parallel light beams, which are then guided to the light modulator 670 by the lens 660. The light modulator 670 modulates these four light beams to be formed into light beams with different images, which are then guided out of the first liquid crystal beam splitting module 600 by the lens 680.

In one or more embodiments, the polarization state of the light beams is switched when the liquid crystal segment 642, 644, 646, or 648 are switched on, i.e., the light beam with the first polarization state becomes the light beam with the second polarization state, or vice versa. Moreover, each of the liquid crystal segments 642, 644, 646, and 648 includes a polarizer for allowing one of the light beam with the first polarization state and the light beam with the second polarization state to pass through the polarizer. The polarizers are respectively disposed on the sides of the liquid crystal segments 642, 644, 646, and 648 closest to the convex lens 650.

Taking the first primary-color light beam 110 with the first polarization state as an example, the polarizers of the liquid crystal segments 642 and 644 may allow the light beam with the first polarization state to pass through the polarizers. In the first time period, the liquid crystal segment 642 is switched on, and the liquid crystal segment 644 is switched off. When the first primary-color light beam 110 with the first polarization state reaches the liquid crystal segment 642 and 644, a portion of the first primary-color light beam 110 reaching the liquid crystal segment 642 becomes the first primary-color light beam 110 with the second polarization state, and a portion of the first primary-color light beam 110 reaching the liquid crystal segment 644 maintains its first polarization state. However, since the polarizers of the liquid crystal segments 642 and 644 only allow the light beam with the first polarization state to pass therethrough, the portion of the first primary-color light beam 110 reaching the liquid crystal segment 642 is blocked, and the portion of the first primary-color light beam 110 reaching the liquid crystal segment 644 can pass through the polarizer.

In the next time period, the liquid crystal segment 642 is switched off, and the liquid crystal segment 644 is switched on. When the first primary-color light beam 110 with the first polarization state reaches the liquid crystal segment 642 and 644, the portion of the first primary-color light beam 110 reaching the liquid crystal segment 642 maintains its first polarization state, and the portion of the first primary-color light beam 110 reaching the liquid crystal segment 644 becomes the first primary-color light beam 110 with the second polarization state. Therefore, the portion of the first primary-color light beam 110 reaching the liquid crystal segment 642 can pass through the polarizer, while the portion of the first primary-color light beam 110 reaching the liquid crystal segment 644 is blocked. Since the optical mechanism of the liquid crystal segments 646 and 648 with respect to the second primary-color light beam 120 with the second polarization state is the same as the optical mechanism of the liquid crystal segments 642 and 644 with respect to the first primary-color light beam 110 with the first polarization state, details of the liquid crystal segments 646 and 648 are not repeated hereinafter. Through such an operation and configuration, therefore, the first liquid crystal beam splitting module 600 can generate four light beams respectively transmitted from the liquid crystal segments 642, 644, 646, and 648 in sequence.

In one or more embodiments, the liquid crystal segments may include a half wave phase retarder to split light beams as described above. The half wave phase retarder can switch the polarization state of the light beam, i.e., the light beam with the first polarization state can be switched to be the light beam with the second polarization state, or vice versa.

For example, each of the liquid crystal segments 644 and 648 may further includes a half wave phase retarder disposed on the incident side of the liquid crystal segment 644 or 648. Taking the first primary-color light beam 110 with the first polarization state as an example, in the first time period, both of the liquid crystal segments 642 and 644 are switched on. When the first primary-color light beam 110 with the first polarization state reaches the liquid crystal segment 642 and 644, the portion of the first primary-color light beam 110 reaching the liquid crystal segment 642 becomes the first primary-color light beam 110 with the second polarization state, and the portion of the first primary-color light beam 110 reaching the half wave phase retarder of the liquid crystal segment 644 becomes the first primary-color light beam 110 with the second polarization state, which then turns back into the first primary-color light beam 110 with the first polarization state after passing through the liquid crystal segment 644. Since the polarizers of the liquid crystal segments 642 and 644 only allow the light beam with the first polarization state to pass therethrough, the portion of the light beam reaching the liquid crystal segment 642 is blocked, and the portion of the light beam reaching the liquid crystal segment 644 can pass through the polarizer.

In the next time period, both of the liquid crystal segments 642 and 644 are switched off. When the first primary-color light beam 110 with the first polarization state reaches the liquid crystal segments 642 and 644, the portion of the first primary-color light beam 110 reaching the liquid crystal segment 642 maintains its first polarization state, and the portion of the first primary-color light beam 110 reaching the half wave phase retarder of the liquid crystal segment 644 becomes the first primary-color light beam 110 with the second polarization state, which maintains its second polarization state after passing through the liquid crystal segment 644. Therefore, the portion of the light beam reaching the liquid crystal segment 644 is blocked, and the portion of the light beam reaching the liquid crystal segment 642 can pass through the polarizer. Since the optical mechanism of the liquid crystal segments 646 and 648 with respect to the second primary-color light beam 120 with the second polarization state is the same as the optical mechanism of the liquid crystal segments 642 and 644 with respect to the first primary-color light beam 110 with the first polarization state, details of the liquid crystal segments 646 and 648 are not repeated hereinafter. Through such an operation and configuration, therefore, the first liquid crystal beam splitting module 600 can generate four light beams respectively transmitted from the liquid crystal segments 642, 644, 646, and 648 in sequence.

It should be understood that the beam splitting methods of the liquid crystal slit group 640 are illustrative only and should not limit the scope of the claimed invention. A person having ordinary skill in the art may design the liquid crystal slit group 640 to thereby vary the beam splitting method thereof according to actual requirements.

The second liquid crystal beam splitting module 700 includes reflectors 710 and 730, a liquid crystal slit group 720, prisms 740 and 760, and a light modulator 750. The first primary-color light beam 110 with the second polarization state and the second primary-color light beam 120 with the first polarization state are guided to the liquid crystal slit group 720 which includes at least four liquid crystal segments. Each of the first primary-color light beam 110 with the second polarization state and the second primary-color light beam 120 with the first polarization state is guided to two of the liquid crystal segments adjacent to each other. The light beams form four light beams in sequence after passing through the liquid crystal slit group 720, and the lens 740 guides these four light beams to the light modulator 750. The light modulator 750 modulates the four light beams to be formed into light beams with different images, which are then guided out of the second liquid crystal beam splitting module 700 by the lens 760. Since the beam splitting process of the liquid crystal slit group 720 is similar to that of the liquid crystal slit group 640, details of beam splitting process of the liquid crystal slit group 720 are not repeated hereinafter.

After the beam splitting process of the liquid crystal slits groups 640 and 720 described above, the light beams passing through the first liquid crystal beam splitting module 600 and the second liquid crystal beam splitting module 700 can respectively be split to form four light beams. These eight beams become light beams with images, and then are guided by the polarized beam combining element 800 to one of a plurality of image light source segments 852 in the projection lens 850 for generating eight images in sequence. Moreover, two images can be simultaneously provided by the first liquid crystal beam splitting module 600 and the second liquid crystal beam splitting module 700 in one time period. In other words, the eight images can realize a minimal image refresh rate requirement (at least 60 Hz per image) if the switching rates of the light modulator 670 and 750 are higher than 240 Hz.

Figure 6:
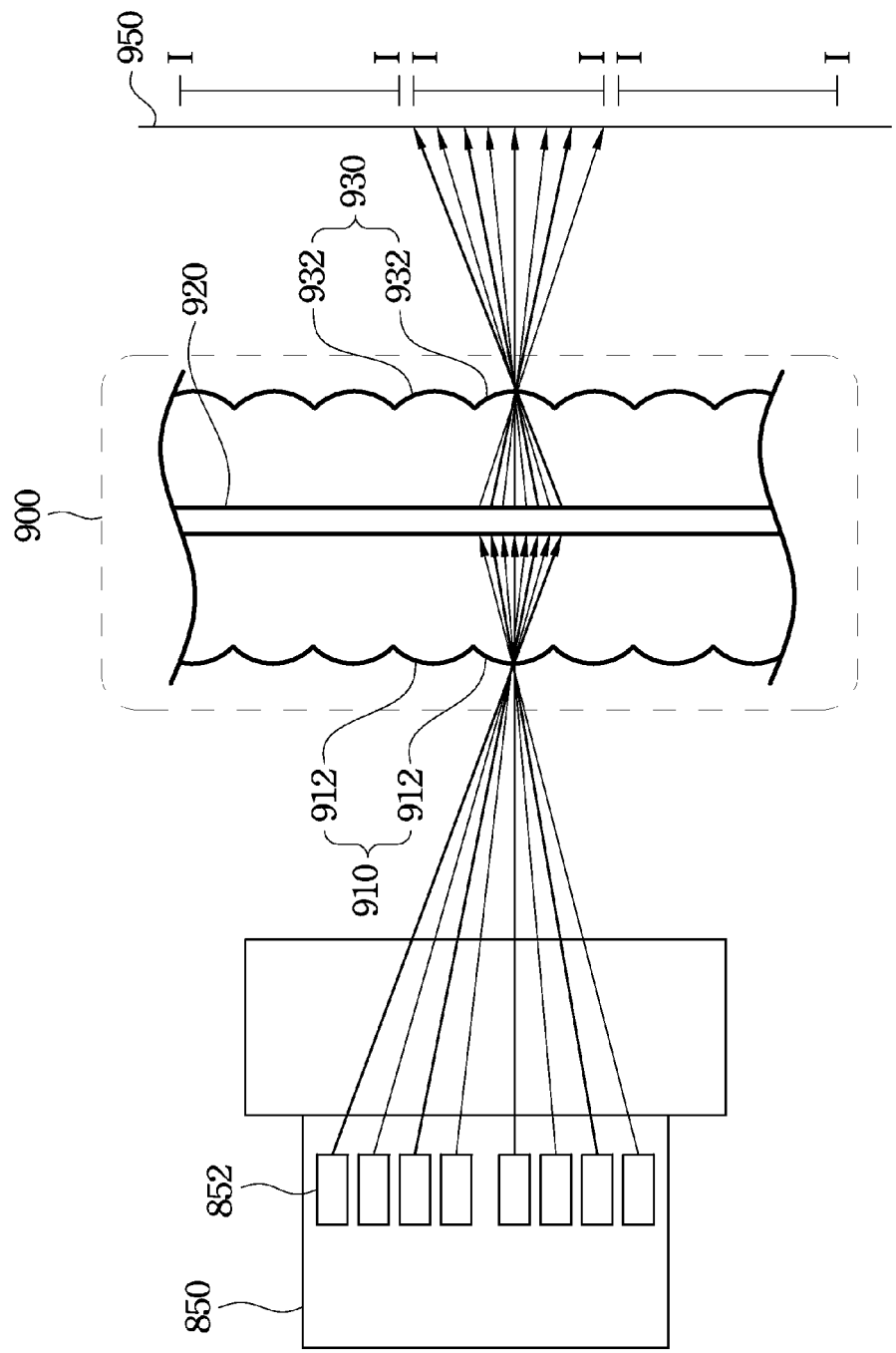
FIG. 6 is a schematic diagram of a projection lens of FIG. 5 when projecting light.

FIG. 6 is a schematic diagram of the projection lens 850 of FIG. 5 when projecting light. The projection lens 850 can project the images of the image light source segments 852 onto a screen 900. In order to realize multi-view images, the screen 900 may include a diffuser 920 and lenticular lens arrays 910 and 930. The lenticular lens array 910 includes a plurality of lenticular lenses 912 for converging the image light beams projected from the projection lens 850 to the diffuser 920 and to form image frames. Each of lenticular lenses 932 of the lenticular lens array 930 can then diverge the image frames on the diffuser 920. Therefore, when the eyes of an observer are in any of the viewing boxes I-I on the observing plane 950, he or she can receive any two image frames projected from the projection lens 850 to experience stereoscopic images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display light source, comprising:
   a light source for providing a light beam;
   a color wheel comprising a first path segment and a second path segment, wherein each of the first path segment and the second path segment includes a reflective segment and at least one filtering segment arranged along an arcuate direction of the color wheel, the first path segment is disposed on an inner loop of the color wheel, and the second path segment is disposed on an outer loop of the color wheel, the inner loop and the outer loop forming adjacent concentric rings coaxial with the color wheel, the at least one filtering segment of the first path segment aligns to the reflective segment of the second path segment along the radial direction of the color wheel, and the reflective segment of the first path segment aligns to the filtering segment of the second path segment along the radial direction of the color wheel;
   an optical module disposed between the light source and the color wheel for guiding the light beam to the color wheel; and
   an actuator for rotating the color wheel, such that the light beam impinges on at least one of the reflective segments and the filtering segments of the first path segment and the second path segment, wherein when the light beam impinges on the filtering segment of the first path segment, the light beam passes through the filtering segment of the first path segment and is filtered to form a first primary-color light beam, and when the light beam impinges on the reflective segment of the first path segment, the light beam is reflected to the optical module, the optical module guiding the reflected light beam to the filtering segment of the second path segment, such that the reflected light beam passes through the second path segment and is filtered to form a second primary-color light beam.

2. The display light source of claim 1, wherein the filtering segment of the first path segment comprises a plurality of primary-color filtering segments.

3. The display light source of claim 1, wherein the filtering segment of the second path segment comprises a plurality of primary-color filtering segments.

4. The display light source of claim 1, wherein the optical module comprises:

an isosceles prism, wherein a bottom surface of the isosceles prism is a refractive surface;

a pair of wedge prisms, wherein a long-side surface of each of the wedge prisms is an incident surface, and a total internal reflection gap is formed between the other long-side surface of each of the wedge prisms and an opposing equal-side surface of the isosceles prism; and a condenser lens disposed between the isosceles prism and the color wheel, wherein the condenser lens is for converging a light beam that travel from the refractive surface of the isosceles prism to the color wheel, and guiding a light beam that travels from the reflective segments of the first path segment and the second path segment to the refractive surface of the isosceles prism.

5. The display light source of claim 4, wherein an angle between the two long-side surfaces of each of the wedge prisms satisfies the following relationship:

$$\theta = -\tan^{-1}((n\cos 3\phi + \sin\phi)/(n\sin 3\phi + \cos\phi)),$$

where $\theta$ is the angle between the two long-side surfaces of the each of the wedge prisms, n is a refractive index of the isosceles prism and the pair of the wedge prisms, and $\phi$ is a bottom angle of the isosceles prism.

6. The display light source of claim 4, wherein the condenser lens includes at least one convex lens.

7. The display light source of claim 1, wherein the light source is a high-pressure mercury lamp.

\* \* \* \* \*